UNITED STATES PATENT OFFICE.

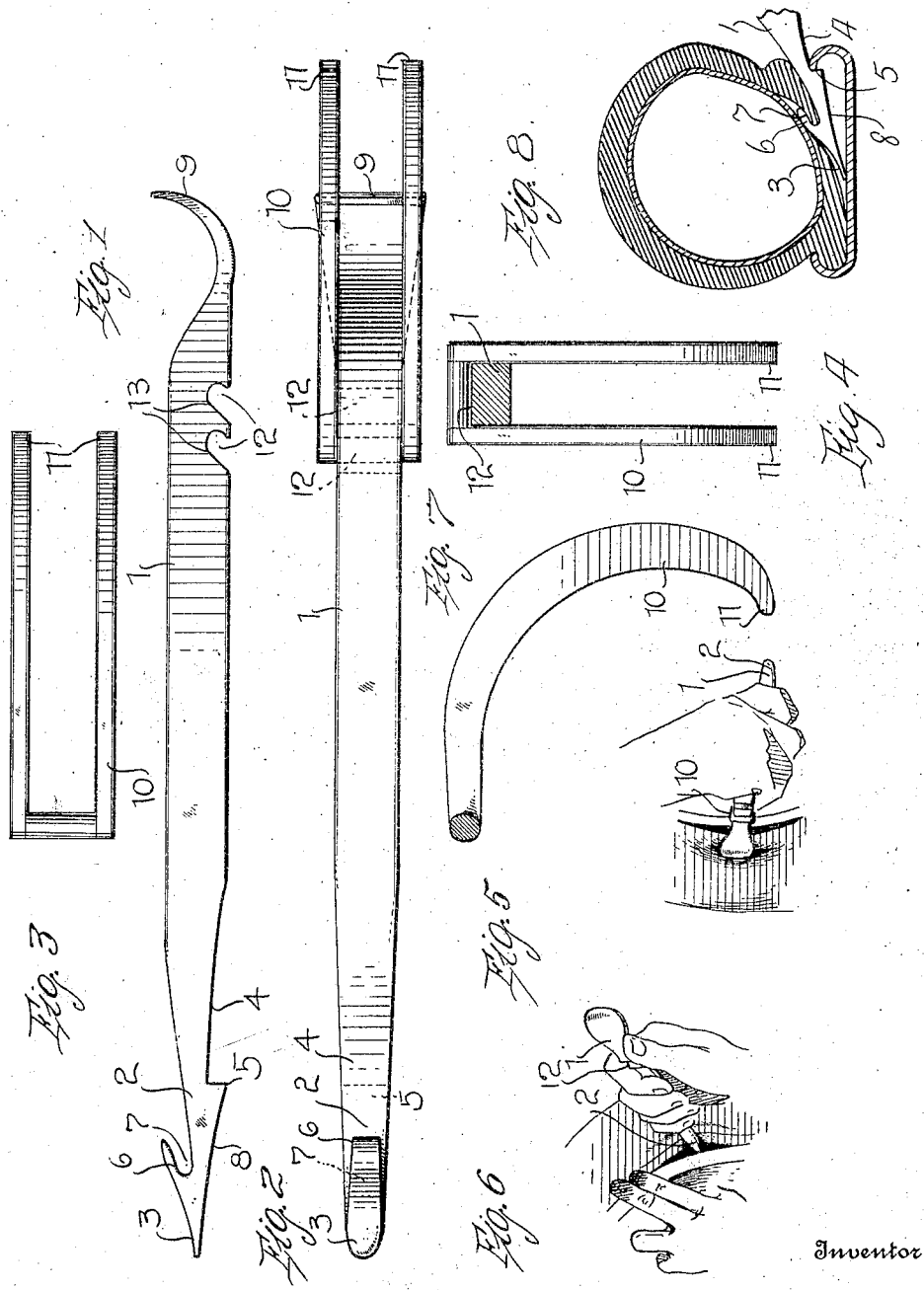
C. E. SPECK.
TIRE TOOL.
APPLICATION FILED FEB. 6, 1913.
1,100,032.
Patented June 16, 1914.
Inventor
CHARLES E. SPECK

CHARLES E. SPECK, OF ST. MARYS, OHIO.

TIRE-TOOL.

1,100,032.

Specification of Letters Patent. Patented June 16, 1914.

Application filed February 6, 1913. Serial No. 746,639.

*To all whom it may concern:*

Be it known that I, CHARLES E. SPECK, a citizen of the United States, residing at St. Marys, in the county of Auglaize and State of Ohio, have invented certain new and useful Improvements in Tire-Tools, of which the following is a specification, reference being had to the accompanying drawings.

This invention relates to new and useful improvements in tire tools and more particularly to a tool of this character which is especially adapted for use upon motor cycle tires, but can be used equally as well upon vehicle tires of various types.

The object of the invention is to provide a tire tool of the above character whereby the tire can be quickly removed from the wheel rim to permit the removal or replacement of the inner tube, or readily placed in position upon the wheel rim.

Another object of the invention is to provide a tool of the above character which will possess advantages in points of efficiency and durability, which is inexpensive of manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a side elevation of my improved tire tool. Fig. 2 is a front elevation; Fig. 3 is a rear elevation of the hook member, Fig. 4 is a sectional view through the body member, showing the link member applied thereto; Fig. 5 is a detail view illustrating the manner of using my improved tool when loosening a tire prior to the removal; Fig. 6 is a detail view illustrating the manner of using my improved tool when placing a tire in position; and Fig. 7 is a longitudinal sectional view of the link member; Fig. 8 is a cross sectional view taken through a tire structure, showing my improved tool in operative position to apply the tire.

Referring more particularly to the drawings, 1 indicates the substantially rectangular body or handle member of my improved tire tool, one end of which tapers into a point 2. The handle member 1 is provided adjacent the point 2 and upon one side thereof with a rim guide 5, said rim guide being formed by cutting a tapering recess 4 into the body, one end of which terminates into a shoulder 5 adapted to be projected within the channel of the rim and contact with the adjacent edge of such rim whereby the tool is maintained in operative position while being drawn around the rim. The body member 1 is further provided, adjacent the point 2 and upon the side opposite the rim guide 5, with the outwardly projecting lip 6 which is spaced from the body 1 to form a notch 7 for the reception of the edge of the tire when placing the same in position upon the wheel rim. The end of the body at the point is curved slightly toward the lip 6 as shown at 8, so that in placing a tire in position, the edge thereof will be pressed inwardly far enough so that it may be readily engaged beneath the rim.

The end of the body opposite the rim guide and lip 6, is provided with a reduced portion, which is formed into an enlarged divergent arcuate shaped hook member 9. This hook member is especially adapted for assisting in the removal of the tire and particularly when the tire sticks a little, as it generally does the first time it is removed. For use in connection with the hook 9 and assisting in removing the tire, I provide an arcuate U-shaped link member 10 the ends of which are provided with the hooks 11 and the intermediate portion adapted to be removably arranged within one of the recesses 12 formed in one edge of the body member 1. The side portions of the U-shaped link member are parallel with each other and when in engagement with the recesses 12 are arranged in close relation to the sides of the handle member 1. It can be easily seen from Fig. 2 of the drawings that when in closed position, the sides of this U-shaped member bear against the outer sides of the hook member 9, which acts as a stop and prevents the same from becoming disengaged from the handle member when held in a downward position. It will be apparent from the showing in Fig. 1, that the rear wall of the recesses 12 slope outwardly, as shown at 13, to permit of the ready insertion and removal of the intermediate portion of the link member. The link member 10 can be made of suitable width so that the same may be used in place of a wrench to loosen or tighten the nut on the valve stem.

In using my improved tool for removing a tire, the hook 9 may be inserted down between the tire and rim, the hook is worked down beneath the edge of the tire which can be pulled out over the rim. The entire tire may be worked over the rim by the hook if desired, or it may be done by hand. In case the tire sticks, the intermediate portion of the link 10 is arranged within the recess 12 and the link arranged between the spokes of the wheel so that the hooks 11 may be engaged with the rim upon the opposite side of the wheel. The lever, formed by the body member 1, is then positioned so that the hook 9 presses against the side of the tire above the rim. Upward pulling power exerted upon the outer end of the lever will press the side of the tire out of the rim groove, so that the same may be readily removed.

In using my improved tool in placing a tire in position upon a wheel rim, the point 3 is inserted beneath the edge of the tire and under the protecting flap until the rim guide 5 drops inside of the grooved edge of the rim of the wheel. The edge of the tire is engaged within the notch 7 and is thus arranged under the protecting flap, the flap being held up by the lip 6 as the body 1 is moved around the rim and by a slight hand pressure on the tire to the rear of the tool in close proximity thereto, the edge of the same will be engaged beneath the inner edge of the rim. The point 2 may be readily removed by turning the body 1 upon its side so that the guide and lip will be withdrawn. If the edge of the tire does not work down beneath the rim sufficiently to hold the tire in place, the hook 9 may be used to push the same down in position. In placing the tire on the rim, the start should be made upon one side of the valve stem and finish upon the other side thereof, so that it will not be necessary to work the point 3 past the valve stem.

From the above description taken in connection with the accompanying drawings, it will be readily apparent that I have provided a simple and durable tire tool whereby a vehicle tire may be quickly and easily removed or placed upon the rim of a wheel. It will also be apparent that the device is extremely simple in its construction, efficient in its operation and can be manufactured at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the appended claims.

What I claim is:—

1. A tire tool including a body having one end portion formed into a point, such end portion being adapted to be extended across and within the channel of the rim of a wheel beneath the tire, such end portion being provided with a shoulder adapted to depend within the channel of a rim and contact with an edge of the rim to prevent outward movement of the body, and a rearwardly and outwardly directed substantially straight lip formed upon the body and disposed upon the side thereof opposite to the shoulder in advance thereof, said lip affording a notch for the reception of the edge of a tire.

2. A tire tool including a body having one end portion formed into a point, such end portion being adapted to be extended across and within the channel of the rim of a wheel beneath the tire, such end portion being provided with a shoulder adapted to depend within the channel of a rim and contact with an edge of the rim to prevent outward movement of the body, and a rearwardly and outwardly directed substantially straight lip formed upon the body and disposed upon the side thereof opposite to the shoulder in advance thereof, said lip affording a notch for the reception of the edge of a tire, the edge of such end portion between the shoulder and the point being disposed on a curve inwardly of the body.

In testimony whereof I hereunto affix my signature in the presence of two witnesses.

CHARLES E. SPECK

Witnesses:
  C. W. KUHLMANN,
  JOHN MARTIN.